United States Patent
Machida

(10) Patent No.: US 7,486,734 B2
(45) Date of Patent: Feb. 3, 2009

(54) DECODING AND CODING METHOD OF MOVING IMAGE SIGNAL, AND DECODING AND CODING APPARATUS OF MOVING IMAGE SIGNAL USING THE SAME

(75) Inventor: Yutaka Machida, Yokohama (JP)

(73) Assignee: Panasonic Corporation, Osaka (JP)

( * ) Notice: Subject to any disclaimer, the term of this patent is extended or adjusted under 35 U.S.C. 154(b) by 1565 days.

(21) Appl. No.: 09/050,808

(22) Filed: Mar. 30, 1998

(65) Prior Publication Data

US 2001/0055338 A1   Dec. 27, 2001

(30) Foreign Application Priority Data

Mar. 31, 1997   (JP)   ................................. 9-094478

(51) Int. Cl.
 *H04N 7/12*   (2006.01)
(52) U.S. Cl. ............................ 375/240.25; 375/240.01; 375/240.12; 375/240.16
(58) Field of Classification Search ................. 348/410, 348/411, 415, 416, 714, 461, 462, 463, 464, 348/465, 616; 375/240.23, 240.15, 240, 375/240.12, 240.2, 240.16, 240.01, 240.25; 714/748, 752; 386/68
See application file for complete search history.

(56) References Cited

U.S. PATENT DOCUMENTS

| | | | | | |
|---|---|---|---|---|---|
| 5,117,288 | A | * | 5/1992 | Eisenhardt et al. | 375/240.12 |
| 5,247,363 | A | * | 9/1993 | Sun et al. | 348/616 |
| 5,410,553 | A | | 4/1995 | Choon | |
| 5,539,466 | A | * | 7/1996 | Igarashi et al. | 375/240.15 |
| 5,550,847 | A | * | 8/1996 | Zhu | 348/416 |
| 5,633,682 | A | * | 5/1997 | Tahara | 375/240.23 |
| 5,699,474 | A | * | 12/1997 | Suzuki et al. | 386/68 |
| 5,737,022 | A | * | 4/1998 | Yamaguchi et al. | 348/416 |
| 5,781,561 | A | * | 7/1998 | Machida et al. | 348/403 |

(Continued)

FOREIGN PATENT DOCUMENTS

CA   2182005   8/1995

(Continued)

OTHER PUBLICATIONS

S. Fukunaga et al., "Error Resilient Video Coding by Dynamic Replacing of Reference Pictures ", pp. 1503-1508, IEEE GLOBECOM 96.

(Continued)

*Primary Examiner*—Allen Wong
(74) *Attorney, Agent, or Firm*—RatnerPrestia

(57) ABSTRACT

A decoding method and coding method of moving image signal, and a decoding apparatus and coding apparatus using the same, provides for coding or decoding at least two or more motion vectors, relating to the present processing pixel block, compensating the motion of the coded frame corresponding to each motion vector, generating two or more predicted images relating to the present processing image block, and selecting the predicted image for use in reconstruction of the present processing pixel block depending on presence or absence of decoding error contained in these two or more predicted images. Accordingly, if a decoding error occurs due to bit error in the bit stream, propagation of picture quality deterioration in time can be suppressed, so that excellent decoding of digital moving image signal is realized.

13 Claims, 6 Drawing Sheets

U.S. PATENT DOCUMENTS

| | | | |
|---|---|---|---|
| 5,786,860 A | * | 7/1998 | Kim et al. ............... 375/240.15 |
| 5,903,311 A | * | 5/1999 | Ozcelik et al. ........... 375/240.2 |
| 5,982,439 A | * | 11/1999 | Parke .................... 375/240.16 |
| 6,081,551 A | * | 6/2000 | Etoh ......................... 375/240 |

FOREIGN PATENT DOCUMENTS

| | | |
|---|---|---|
| EP | 0 521 529 | 1/1993 |
| EP | 0 538 667 | 4/1993 |
| EP | 0 588 736 | 3/1994 |

OTHER PUBLICATIONS

European Search Report corresponding to application No. EP 98 10 4075 dated Jul. 24, 1998.

* cited by examiner

DECODING AND CODING METHOD OF MOVING IMAGE SIGNAL, AND DECODING AND CODING APPARATUS OF MOVING IMAGE SIGNAL USING THE SAME

FIELD OF THE INVENTION

The present invention relates to a decoding method and coding method of digital moving image signal, and a decoding apparatus and coding apparatus using the same methods, for use in television telephone, television conference, and recording of video signals and communication of various signals. More particularly, it relates to a decoding method and coding method of digital moving image signal, and a decoding apparatus and coding apparatus using the same, being designed so that effects of decoding errors may not propagate to frames and fields later in time.

BACKGROUND OF THE INVENTION

In television telephone or television conference, in order to transmit a moving image efficiently even in a narrow transmission route, the moving image is digitized, and this signal is further processed by digital image compression, and is transmitted, and at the receiving side, the compressed digital moving image signal is decoded, and the moving image is reproduced.

In a video disc or the like, in order to accumulate more moving images in one disc, the digital moving image signal is coded and the image is compressed.

The conventional coding method and decoding method of digital moving image signal include the ITU-T Recommendation H. 261 recommended in March 1993, and the MPEG by the ISO, and the ITU-T Recommendation is mainly described in this specification. For the sake of convenience, the coding method is first described, and then the decoding method, by referring to FIG. 4 to FIG. 6.

The coding method of H. 261 is realized, as shown in FIG. 4, by a coding apparatus comprising motion vector detecting means 401, motion compensation means 402, prediction error calculating means 403, intra-inter judging means 404, DCT 405, quantizing means 406, variable length coding means 407, inverse quantizing means 408, inverse DCT 409, reconstruction means 410, frame memory 411, and intra/inter switch 412.

Each constituent element of H. 261 coding method is described below. First, the motion vector detecting means 401 detects the motion vector between a previous reconstruction frame stored in the frame memory 411, and an entered present frame. The motion vector is detected, as shown in FIG. 5, in a unit of pixel block called macro block. The motion vector may be regarded as a spatial displacement amount of pixel block between the previous reconstruction frame and the present frame. Next, the motion compensation means 402 displaces the pixel block of the previous reconstruction frame stored in the frame memory 411 according to the motion vector, and generates a predicted image. This motion compensation is a process for reducing the prediction error in the prediction error calculation at a next step.

The prediction error calculating means 403 calculates the differential value between the macro block of the entered present frame and the predicted image in the pixel unit, and issues as a prediction error. Further, both the macro block of the present frame and the prediction error are entered into the intra/inter judging means 404. Herein, for example, by comparison between the variance of pixels in the macro block of the present frame and the variance of the prediction error, it is judged whether coding is more efficient by directly coding the macro block of the present frame (intra-coding), or coding is more efficient by coding the prediction error (inter-coding), and according to the result, either the macro block of the present frame or the prediction error is issued. At the same time, the result of judgement is issued as an intra/inter control signal.

The macro block of the present frame or the prediction error issued from the intra/inter judging means 404 is transformed into a frequency region by the DCT 405 and is further transformed into a quantizing coefficient by the quantizing means 406 to be curtailed in redundancy, and further the quantizing coefficient is transformed into a variable length code on the basis of the statistic character by the variable length coding means 407, and the quantity of information is curtailed. In the variable length coding means 407, further, the intra/inter control signal and motion vector are entered, and coded into variable length codes. The variable length coding means 407 multiplexes all these variable length codes, and issues as a bit stream.

On the other hand, the quantizing coefficient which is the output of the quantizing means 406 is inversely quantized by the inverse quantizing means 408, and is inversely transformed from the frequency region by the inverse DCT 409. When the macro block being presently coded is intra-coding, the intra/inter switch 412 is turned off, and the output from the inverse DCT 409 is directly stored in the frame memory 411. To the contrary, when the macro block being presently coded is inter-coding, the intra/inter switch 412 is turned on, and the output of the inverse DCT 409 and the output of the motion compensation means 402 are added in the reconstruction means 410, and stored in the frame memory 411. Thus, the present reconstruction frame is stored in the frame memory 411, and it is used in prediction of next frame.

Next, the decoding method of H. 261 is realized by an apparatus, as shown in FIG. 6, comprising variable length code decoding means 601, inverse quantizing means 602, inverse DCT 603, frame memory 604, motion compensation means 605, intra/inter switch 606, and reconstruction means 607.

Each constituent element of the H. 261 decoding method is described below. First, the variable length code decoding means 601 separates and decodes the variable length code from the entered bit stream, and issues the quantizing coefficient, intra/inter control signal, and motion vector in the macro block unit. The quantizing coefficient is inversely quantized by the inverse quantizing means 602, and is inversely transformed from the frequency region by the inverse DCT 603. The motion compensation means 605 displaces the pixel block of the previous reconstruction frame stored in the frame memory 604, on the basis of the motion vector, and generates a predicted image.

When the intra/inter control signal instructs intra-coding, the intra/inter switch 606 is turned off, and the output from the inverse DCT 603 is directly stored in the frame memory 604. On the other hand, when the intra/inter control signal instructs inter-coding, the intra/inter switch 606 is turned on, and the output of the inverse DCT 603 and the output of the motion compensation means 605 are added in the reconstruction means 607, and stored in the frame memory 604. Thus, the present reconstruction frame is stored in the frame memory 604, and it is used in prediction of next frame and is also issued as a decoded image.

In the coding method and decoding method of H. 261, the inverse quantizing means, inverse DCT, and motion compensation means process the same, and therefore the reconstruction frames stored in the frame memory of the coding method and decoding method always coincide with each other.

Generally, since the bit stream issued by the coding method of moving image signal is composed of variable length codes, in case an error occurs in transmission or accumulation, if it is an error of one bit, the decoding error occurs in a wide range, and the picture quality of the reconstruction frame deteriorates. In the conventional decoding method of moving image signal, the reconstruction frame lowed in picture quality due to decoding error is used in prediction of next frame, this picture quality deterioration can propagate to the succeeding frames later in time.

As one of the prior arts presenting a method of solving this problem, "Error Resilient Video Coding by Dynamic Replacing of Reference Pictures" (S. Fukunaka et al.) (1996 IEEE) is known, but when a decoding error occurs, the previously decoded video signal is directly used again, the improving effect of picture quality deterioration was trifling.

SUMMARY OF THE INVENTION

It is hence an object of the invention to present an excellent decoding method and coding method of digital moving image signal, and a decoding apparatus and coding apparatus using the same, capable of preventing propagation of picture quality deterioration in time even if a decoding error occurs due to bit error in the bit stream, and decoding with less picture quality deterioration.

Relating to the present processing pixel block, in the coding method and decoding method of digital moving image signal of the invention, at least two or more motion vectors are coded or decoded, and the motion of the decoded frame corresponding to each motion vector is compensated, and two or more predicted images relating to the present processing pixel block are generated. In the decoding method of moving image signal of the invention, depending on the presence or absence of decoding error contained in the two or more predicted images, the predicted image to be used reconstruction of the present processing pixel block is selected.

According to the invention thus constituted, if decoding error occurs due to bit error in the bit stream, an excellent coding method and decoding method of digital moving image signal capable of suppressing propagation of picture quality deterioration in time can be presented.

Figure 1:
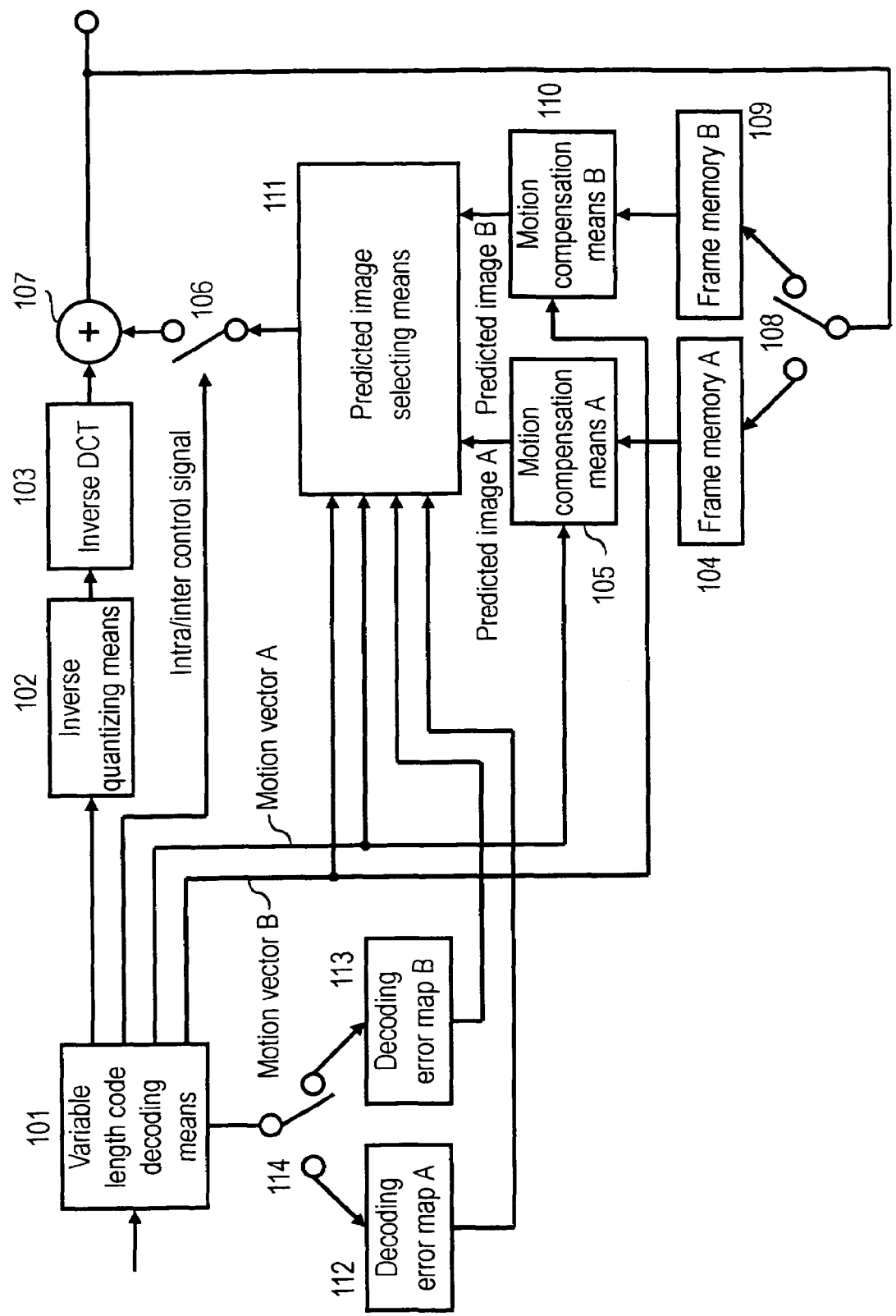
FIG. 1 is a drawing showing a constitution of a decoding apparatus for realizing a decoding method of moving image signal in first and second embodiments of the invention.

| Reference Numerals | |
|---|---|
| 101 | Variable length code decoding means |
| 102 | Inverse quantizing means |
| 103 | Inverse DCT |
| 104 | Frame memory A |
| 105 | Motion compensation means A |
| 106 | Intra/inter switch |
| 107 | Reconstruction means |
| 108 | Frame memory changeover switch |
| 109 | Frame memory B |
| 110 | Motion compensation means B |
| 111 | Predicted image selecting means |
| 112 | Decoding error map A |
| 113 | Decoding error map B |
| 114 | Decoding error map changeover switch |
| 301 | Motion vector detecting means A |
| 302 | Motion compensation means A |
| 303 | Prediction error calculating means |
| 304 | Intra/inter judging means |
| 305 | DCT |
| 306 | Quantizing means |
| 307 | Variable length coding means |
| 308 | Inverse quantizing means |
| 309 | Inverse DCT |
| 310 | Reconstruction means |
| 311 | Frame memory A |
| 312 | Intra/inter switch |
| 313 | Motion vector detecting means B |
| 314 | Motion compensation means B |
| 315 | Predicted image combining means |
| 316 | Frame memory B |
| 317 | Frame memory changeover switch |
| 401 | Motion vector detecting means |
| 402 | Motion compensation means |
| 403 | Prediction error calculating means |
| 404 | Intra/inter judging means |
| 405 | DCT |
| 406 | Quantizing means |
| 407 | Variable length coding means |
| 408 | Inverse quantizing means |
| 409 | Inverse DCT |
| 410 | Reconstruction means |
| 411 | Frame memory |
| 412 | Intra/inter switch |
| 601 | Variable length code decoding means |
| 602 | Inverse quantizing means |
| 603 | Inverse DCT |
| 604 | Frame memory |
| 605 | Motion compensation means |
| 606 | Intra/inter switch |
| 607 | Reconstruction means |

DESCRIPTION OF THE PREFERRED EMBODIMENTS

Preferred embodiments of the invention are described below while referring to FIG. 1 to FIG. 3.

First Embodiment

A first embodiment of the invention relates to a decoding method of moving image signal designed to select a predicted image to be used in reconstruction of present processing pixel block, depending on presence or absence of decoding error contained in two or more predicted images.

Figure 2:
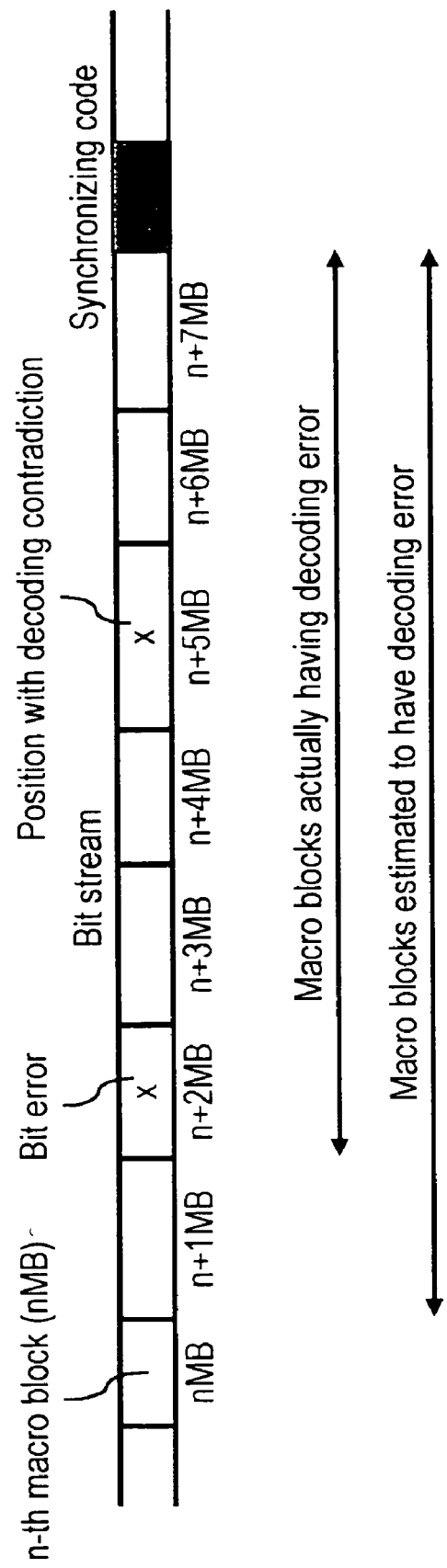
FIG. 2 is a diagram showing an estimating method of macro block having a decoding error in the decoding method of moving image signal in the first and second embodiments of the invention.

The decoding method of moving image signal in the first embodiment of the invention is realized, as shown in FIG. 1, by a decoding apparatus comprising variable length code decoding means 101, inverse quantizing means 102, inverse DCT 103, frame memory A 104, motion compensation means A 105, intra/inter switch 106, reconstruction means 107, frame memory changeover switch 108, frame memory B 109, motion compensation means B 110, predicted image selecting means 111, decoding error map A 112, decoding error map B 113, and decoding error map changeover switch 114.

The operation of the decoding method of moving image signal in the first embodiment of the invention is described below. First, the decoding error map changeover switch 114 is set at the decoding error map B 113 side, and the frame memory changeover switch 108 is set at the frame memory B 109 side.

The variable length code decoding means 101 separates and decodes a variable length code from the entered bit stream, and issues quantizing coefficient, intra/inter control signal, motion vector A, and motion vector B in macro block unit, and also writes presence or absence of decoding error in the decoding error map B 113. The decoding error map is a memory for storing the decoded state about all macro blocks in one frame, by expressing, for example, a correctly decoded macro block as 1 and a macro block having decoding error as 0. In the decoding error map A 112, the decoded state one frame before in time from the present processing macro block is stored, and in the decoding error map B 113, the decoded state two frames before in time from the present processing macro block is stored.

In the variable length code decoding means 101, various means for detecting decoding error of macro block may be considered, and, for example, it may be realized as follows. When decoding a moving image signal, if there is a bit error in the entered bit stream, all macro blocks from the bit having the error until a next synchronizing code (start code) appears cannot be decoded correctly. Generally, unless bit error detecting means is provided, macro blocks that cannot be decoded correctly due to bit error cannot be identified. However, while decoding the bit stream from the wrong bit until appearance of next synchronizing code, (1) a variable length code not specified preliminarily may appear, (2) a value exceeding an allowable range may be decoded, and other contradictions may occur at high probability.

By making use of the character of (1) or (2), it may be possible to estimate that there is a decoding error in N macro blocks tracing back from the macro block having such decoding contradiction, and all macro blocks after the macro block generating decoding contradiction until appearance of synchronizing code. An example of N=4 is shown in FIG. 2. In the example in FIG. 2, since decoding contradiction took place when decoding the (n+5)-th macro block, it is estimated that there is a decoding error in all macro blocks from the (n+1)-th macro block, four macro blocks before, till the (n+7)-th macro block just before the synchronizing signal.

Consequently, the quantizing coefficient issued from the variable length code decoding means 101 is inversely quantized by the inverse quantizing means 102, and is inversely transformed from the frequency region by the inverse DCT 103.

On the other hand, in the frame memory A 104, the reconstruction image of one frame before in time from the present processing macro block is stored, and in the frame memory B 109, the reconstruction image of two frames before in time from the present processing macro block is stored. The motion vector A is a motion vector corresponding the frame memory A 104, and the motion vector B is a motion vector corresponding to the frame memory B 109. That is, the motion compensation means A 105 generates a predicted image A by displacing the pixel block of the reconstruction frame of one frame before stored in the frame memory A 104, according to the motion vector A. Similarly, the motion compensation means B 110 generates a predicted image B by displacing the pixel block of the reconstruction frame of two frames before stored in the frame memory B 109, according to the motion vector B.

The predicted image selecting means 111 first identifies the position of the pixel block to be compensated of motion, by using the value of the entered motion vector A. Comparing the position of this pixel block and the position of the error information stored in the decoding error map A 112, presence or absence of decoding error contained in the predicted image A is judged. Similarly, predicted image selecting means 111 judges presence or absence of decoding error contained in the predicted image B, from the contents of the value of the entered motion vector B and decoding error map B 113. When judging that a decoding error is contained in the predicted image A, the predicted image selecting means 111 issues only the predicted image B, or, to the contrary, when judging that a decoding error is contained in the predicted image B, it issues only the predicted image A. If it is judged that error is not contained in either predicted image A or predicted image B, the average of the predicted image A and predicted image B is calculated and issued in the pixel unit.

If it is judged that error is contained in both predicted image A and predicted image B, the average of the predicted image A and predicted image B may be calculated and issued in the pixel unit, the predicted image A may be issued, or the predicted image B may be issued, as determined preliminarily.

When the intra/inter control signal issued from the variable length code decoding means 101 instructs intra-coding, the intra/inter switch 106 is turned off, and the output from the inverse DCT 103 is directly stored in the frame memory B 109. On the other hand, when the intra/inter control signal instructs inter-coding, the intra/inter switch 106 is turned on, and the output of the inverse DCT 103 and the output of the predicted image selecting means 111 are added in the reconstruction means 107, and stored in the frame memory B 109. Thus, the present reconstruction frame is stored in the frame memory B 109, and it is issued as decoded image.

After completion of decoding process of the present frame, the decoding error map changeover switch 114 is changed over to the decoding error map A 112 side, and the frame memory changeover switch 108 is changed over to the frame memory A 104 side. By this changeover, in decoding of next frame, the decoded state of two frames before in time is stored in the decoding error map A 112, and the decoded state of one frame before in time is stored in the decoding error map B 113. Likewise, the reconstruction image of two frames before in time is stored in the frame memory A 104, and the reconstruction image of one frame before in time is stored in the frame memory B 109.

In the first embodiment of the invention, since the decoding method of moving image signal is thus constituted, by using only the predicted image not containing decoding error in reconstruction of the present processing pixel block, the picture quality deterioration due to decoding error is prevented from propagating into the frames subsequent in time.

In the decoding method of moving image signal of the invention, the decoding error map and frame memory are provided by two pieces each, but by using three pieces or more, the decoded state and reconstruction image of three frames or more before in time may be stored. Incidentally, the means for estimating the macro block having decoding error by decoding contradiction, and the means for judging decoding error contained in the predicted image by using the decoding error map are only example, and they may be composed of other means.

Second Embodiment

A second embodiment of the invention relates to a decoding method of moving image signal, in which if decoding error is not contained in plural predicted images out of two or more predicted images, the predicted image produced from the latest decoded frame in time out of the predicted images free from decoding error is used in reconstruction of the present processing pixel block.

The decoding method of moving image signal of the second embodiment of the invention is realized by the same decoding apparatus as in the first embodiment shown in FIG. 1. The operation of the decoding method of the moving image signal of the second embodiment of the invention is described below. The operation other than that of the predicted image selecting means 111 is not particularly different from that in the first embodiment.

In the predicted image selecting means 111, if it is judged that there is no error contained in either predicted image A or predicted image B, it is constituted to issue the newer one of the predicted image A or predicted image B. That is, if it is judged that error is not contained in either predicted image A or predicted image B, it is constituted to issue always only the predicted image produced from the reconstruction image of one frame before.

In the decoding method of the moving image signal realized in the decoding apparatus shown in FIG. 1, the decoding error map and frame memory are provided by two pieces each, but by using three pieces or more, the decoded state and reconstruction image of three frames or more before in time may be stored. If there are three predicted images, supposing, for example, there is an error in the latest predicted image A, out of predicted image A, predicted image B, and predicted image C, and no error in the predicted image B and predicted image C, it is constituted to issue the latest predicted image B out of the predicted image B and predicted image C. It is the same if there are four or more images. If all predicted images are wrong, one predetermined predicted image may be issued.

In the second embodiment of the invention, since the decoding method of the moving image signal is thus constituted, the correlation of the present processing pixel block to be reconstructed and the predicted image is heightened due to similarity of moving images in time, so that the code quantity necessary for reconstruction of present processing block is decreased.

Third Embodiment

A third embodiment of the invention is a coding method of moving image signal for inter-coding the present processing pixel block when the correlation is high between two or more predicted images compensated of motion by two or more motion vectors, and intra-coding the present processing pixel block when the correlation is low between two or more predicted images.

Figure 3:
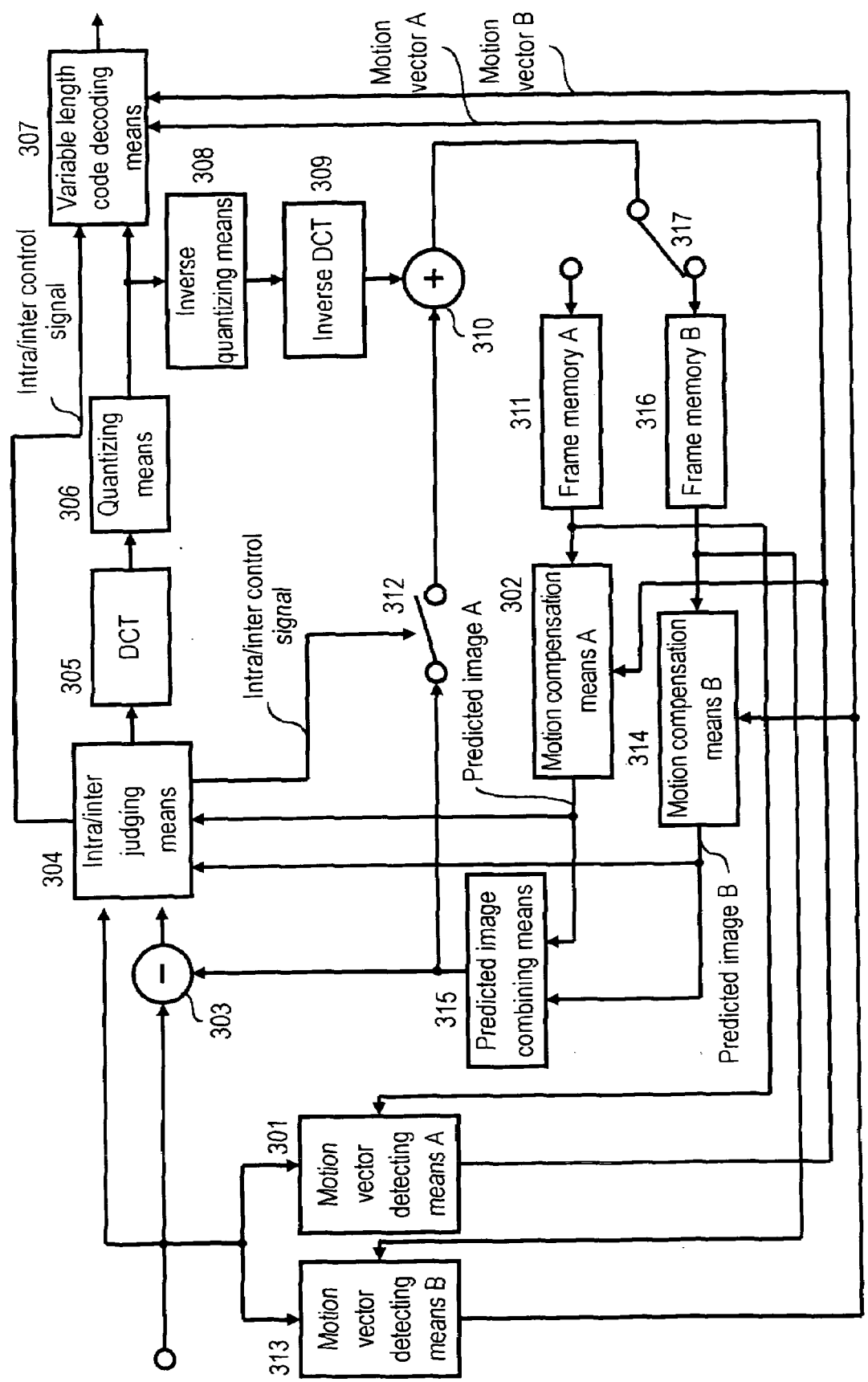
FIG. 3 is a diagram showing a constitution of a coding apparatus for realizing a coding method of moving image signal in third and fourth embodiments of the invention.
Figure 4:
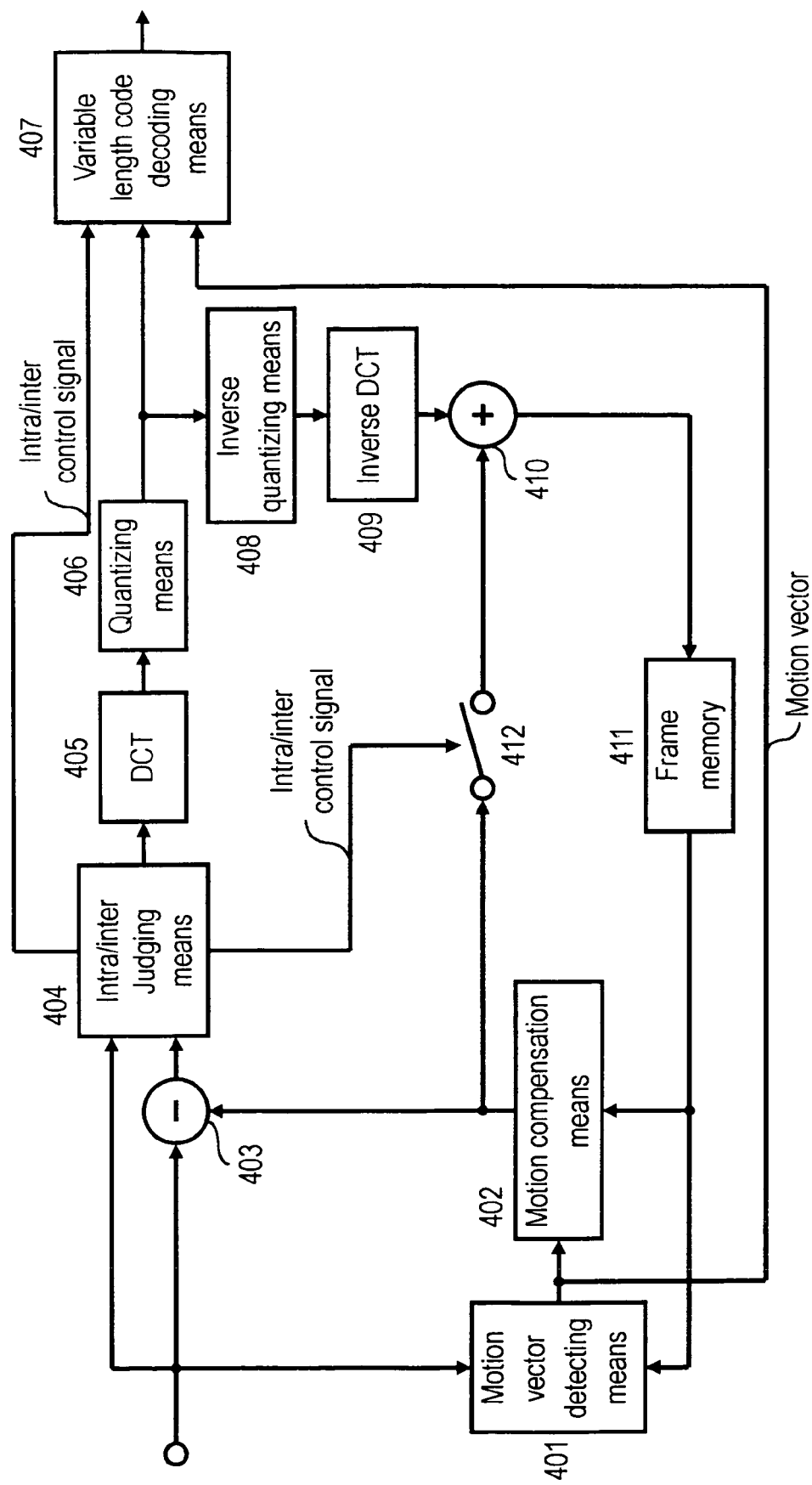
FIG. 4 is a diagram showing a constitution of a coding apparatus for realizing a coding method of moving image signal of prior art.
Figure 5:
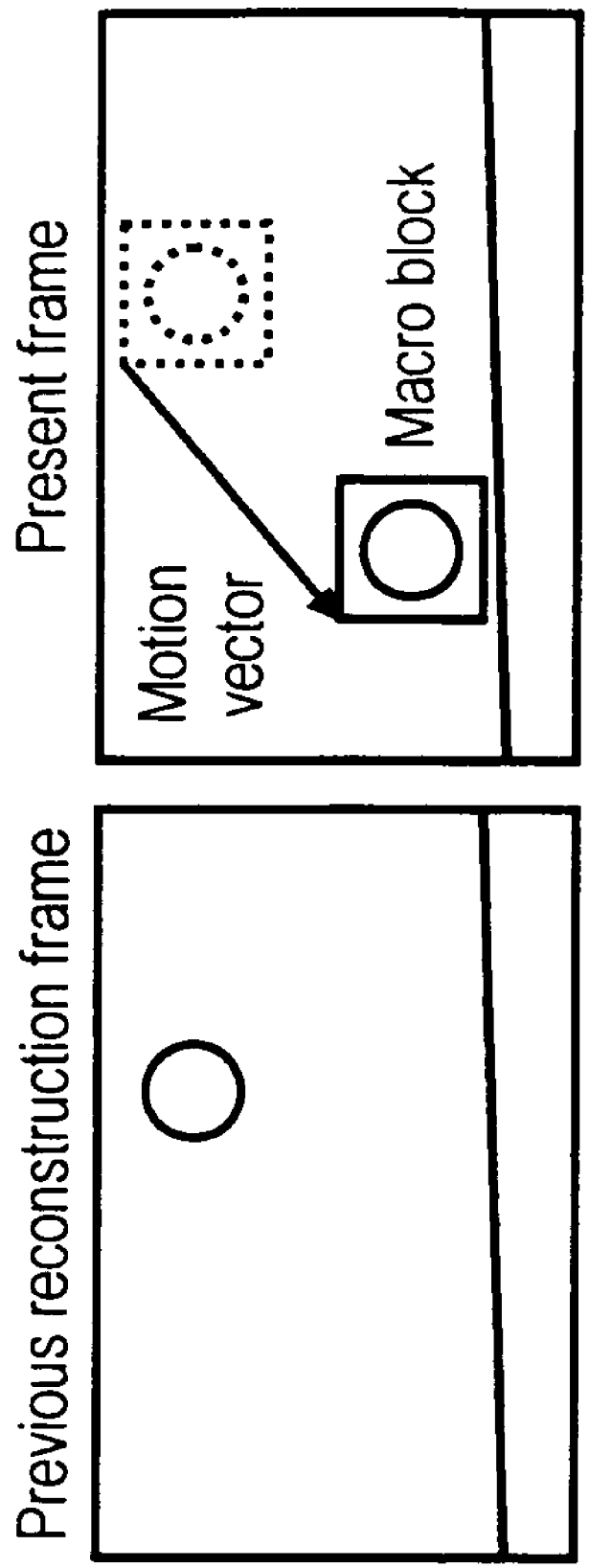
FIG. 5 is a diagram showing a detecting method of motion vector.
Figure 6:
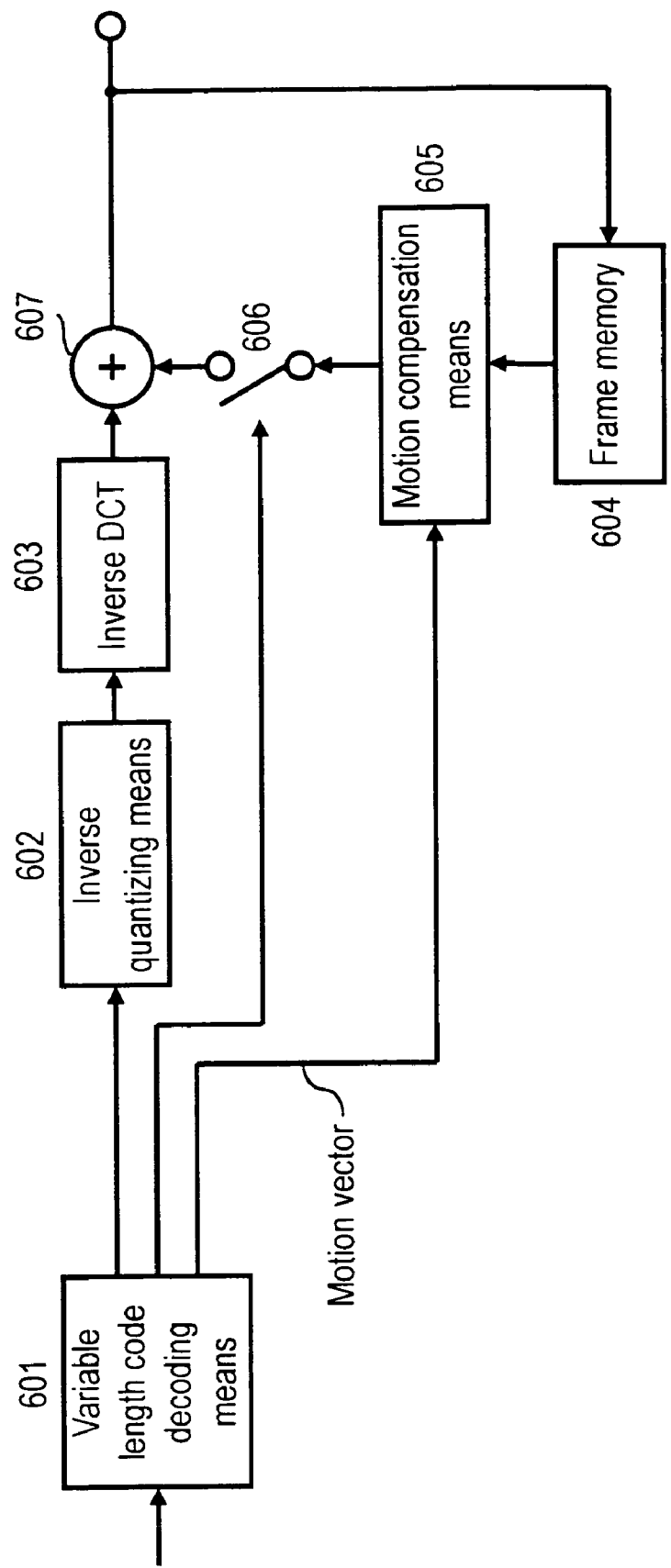
FIG. 6 is a diagram showing a constitution of a decoding apparatus for realizing a decoding method of moving image signal of prior art.

The coding method of the moving image signal of third embodiment of the invention is realized, as shown in FIG. 3, by the coding apparatus comprising motion vector detecting means A 301, motion compensation means A 302, prediction error calculating means 303, intra/inter judging means 304, DCT 305, quantizing means 306, variable length coding means 307, inverse quantizing means 308, inverse DCT 309, reconstruction means 310, frame memory A 311, intra/inter switch 312, motion vector detecting means B 313, motion compensation means B 314, predicted image combining means 315, frame memory B 316, and frame memory changeover switch 317.

The operation of the coding method of moving image signal of the third embodiment of the invention is described below. First, the frame memory changeover switch 317 is supposed to be set at the frame memory B 316 side.

To begin with, the motion vector detecting means A 301 detects the motion vector A by the reconstruction frame stored in the frame memory A 311 and the entered present frame. Similarly, the motion vector detecting means B 313 detects the motion vector B by the reconstruction frame stored in the frame memory B 316 and the entered present frame. Herein, in the frame memory A 311, the reconstruction image of one frame before in time from the present processing macro block is stored, and in the frame memory B 316, the reconstruction image of two frames before in time from the present processing macro block is stored.

The motion compensation means A 302 generates a predicted image A by displacing the pixel block of the reconstruction frame of one frame before stored in the frame memory A 311, according to the motion vector A. Similarly, the motion compensation means B 314 generates a predicted image B by displacing the pixel block of the reconstruction frame of two frames before stored in the frame memory B 316, according to the motion vector B. The predicted image combining means 315 calculates and issues the average of the entered predicted image A and predicted image B in the pixel unit. The prediction error calculating means 303 calculates the difference of the macro block of the entered present frame and the output of the predicted image combining means 315 in the pixel unit, and issues as prediction error.

Further, the macro block of the present frame, this prediction error, and the predicted image A and predicted image B are entered into the intra/inter judging means 304. Herein, as the processing at first stage, for example, by comparing the variance of pixels in the macro block of the present frame and the variance of the prediction error, it is judged whether the macro block of the present frame is processed by intra-coding or inter-coding. If the inter-coding is judged as a result of processing at the first stage, the correlation between the predicted image A and predicted image B is evaluated as the processing at second stage, and it is judged whether the macro block of the present frame is processed by intra-coding or inter-coding.

Evaluation of correlation of predicted image A and predicted image B and intra/inter judgement at the second stage are executed, for example, as follows. First, the absolute differential sum of predicted image A and predicted image B is calculated in the pixel unit. If the absolute differential sum is larger than a predetermined threshold, the correlation is small, and the macro block of the present frame is judged to be processed by intra-coding. To the contrary, if the absolute differential sum is larger than the predetermined threshold, the correlation is large, and the macro block of the present frame is judged to be processed by inter-coding.

According to the result of judgement by the intra/inter judging means 304 consisting of the processing in the first stage and second stage, either the macro block of the present frame or the pertinent prediction error is issued. At the same time, the result of judgement is also issued as intra/inter control signal. The macro block of the present frame or the pertinent prediction error issued from the intra/inter judging means 304 is put into the variable length coding means 307 through the DCT 305 and quantizing means 306. In the variable length coding means 307, the intra/inter control signal, and motion vector A and motion vector B are also entered, and are coded into variable length codes. The variable length coding means 307 multiplexes all these variable length codes, and issues as a bit stream.

On the other hand, the quantizing coefficient which is the output of the quantizing means 306 is put into the reconstruction means 310 through the inverse quantizing means 308 and inverse DCT 309. When the macro block being presently coded is intra-coding, the intra/inter switch 312 is turned off, and the output from the inverse DCT 309 is directly stored in the frame memory B 316. To the contrary, when the macro block being presently coded is inter-coding, the intra/inter switch 312 is turned on, and the output of the inverse DCT 309 and the output of the predicted image combining means 315 are added in the reconstruction means 310, and stored in the frame memory B 316. Thus, the present reconstruction frame is stored in the frame memory B 316.

After completion of coding process of the present frame, the frame memory changeover switch 317 is changed over to the frame memory A 311 side. By this changeover, in coding of next frame, the reconstruction image of two frames before in time is stored in the frame memory A 311, and the reconstruction image of one frame before in time is stored in the frame memory B 316.

In the third embodiment of the invention, since the coding method of moving image signal is thus constituted, if a predicted image different from the coding side is selected in the decoding method of moving image signal, inter-coding is effected only when the correlation between predicted images is high, so that mis-matching of the predicted images may be kept to a minimum limit.

In the coding method of moving image signal of the third embodiment, two frame memories are provided, but by using three or more, the reconstruction image of three frames or more before in time may be stored. Incidentally, the means for evaluating the correlation of the predicted image A and predicted image B is only an example, and it may be composed of other means.

Fourth Embodiment

A fourth embodiment of the invention relates to a coding method of moving image signal for using the predicted image produced from the latest decoded frame in time out of two or more predicted images compensated of motion by two or more motion vectors in coding of the present processing pixel block.

The coding method of moving image signal of the fourth embodiment of the invention is realized by the same coding apparatus as in the third embodiment shown in FIG. 3. The operation of the coding method of the moving image signal of the fourth embodiment of the invention is described below. The operation other than that of the predicted image combining means 315 is not particularly different from that in the third embodiment.

The predicted image combining means 315 is constituted so as to issue only the newer one of the predicted image A or predicted image B. That is, it is constituted to issue always only the predicted image produced from the reconstruction image of one frame before. If three or more frame memories are used and the reconstruction image of three frames or more before in time is stored, only the latest predicted image may be issued.

In the fourth embodiment of the invention, since the coding method of the moving image signal is thus constituted, the prediction error about the present processing pixel block is smaller owing to the similarity of moving images in times, and the generated code quantity is smaller.

Thus, according to the invention, since the present processing pixel block is reconstructed by selecting the predicted image free from decoding error, the picture quality deterioration due to decoding error does not propagate in time, so that deterioration of reproduced picture quality due to bit error occurring in transmission or accumulation of bit stream may be kept to a minimum limit.

What is claimed is:

1. A method of decoding block N+1 in frame N+1 of successive frames of a predictively coded image signal, said method comprising the steps of:
    a) evaluating block N of frame N and block N-M of frame N-M of said signal, wherein blocks N-M, N and N+1 are in corresponding locations of frames N-M, N and N+1, respectively, M=>1;
    b) identifying an error in one of block N and block N-M;
    c) using the other of block N and block N-M to decode block N+1 based on steps a) and b).

2. A method of decoding block N+1 according to claim 1, wherein the image signal Is a bit stream of a coded compressed video signal, the method further comprising the steps of:
    decoding the bit stream for information defining pixel blocks, the information including motion vectors;
    step b) includes the step of detecting an error in the Information of one of the pixel blocks being blocks N and N-H in each of at least two frames which are prior to a present frame said present frame being frame N+1, said at least two frames being frames N and N-M;
    storing error information of the one of the pixel blocks in each of the at least two frames which are prior to the present frame, in an error memory;
    storing, in a frame memory, video information of the at least two frames which are prior to a present frame;
    generating from the decoded motion vectors at least two predicted pixel blocks corresponding to a present pixel block in the present frame; and
    step b) further includes the step of judging if one of the at least two predicted pixel blocks corresponds to error Information of the at least two frames stored in the error memory.

3. The method of decoding an image signal of claim 2, wherein if the predicted pixel blocks are free from decoding error, the predicted pixel blocks produced from a latest decoded frame is used in reconstruction of the present pixel block.

4. The method for decoding an image signal of claim 2, wherein each of the predicted pixel blocks is generated from reconstructed video frames by using motion vectors which correspond to the reconstructed video frames.

5. The method for decoding an image signal of claim 2, wherein if one of the at least two predicted pixel blocks is judged to correspond to error information stored in the error memory, the other of the at least two predicted pixel blocks is used in reconstruction of the present pixel block.

6. The method of decoding an image signal of claim 2, wherein if the at least two predicted pixel blocks are judged not to correspond to error information stored in the error memory, an average of the at least two predicted pixel blocks is used in reconstructing of the present pixel block.

7. A method of decoding block N+1 according to claim 1, said method further for reconstructing video frames of the image signal, the method further comprising the steps of:

decoding the image signal for information to define pixel blocks of video frames, the information including motion vectors;

step b) includes the step of generating decoding error maps indicating decoding errors of pixel blocks being blocks N and N-M in each of at least two frames which are prior to a present video frame said present frame being frame N+1, said at least two frames being frames N and N-M;

storing the decoding error maps in error memory;

storing, in a frame memory, video information of the at least two frames which are prior in time to the present video frame;

generating from the decoded motion vectors at least two predicted pixel blocks corresponding to a present pixel block in the present video frame; and step b) further includes the steps of determining if a predicted pixel block includes decoding errors corresponding to decoding errors in either of the at least two frames which are prior to the present frame; and based on the determining, judging if the predicted pixel block is used in reconstructing the present video block.

8. Apparatus for decoding block N+1 in frame N+1 of successive frames of a predictively coded image signal, said apparatus comprising:

a detector for evaluating block N of frame N and block N-M of frame N-M of said signal, wherein blocks N-M, N and N+1 are in corresponding locations of frames N-M, N and N+1, respectively, M=>1 and for identifying an error in one of block N and block N-M; and a decoder for using the other of block N and block N-M to decode block N+1.

9. A decoding apparatus according to claim 8, wherein said detector includes a decoding device for decoding the image signal to define pixel blocks of video frames, the image signal including motion vectors;

means for detecting decoding errors of the pixel blocks being blocks N and N-M in each of at least two frames which are prior to a present video frame said present frame being frame N+1, said at least two frames being frames N and N-M;

an error memory for staring decoding error maps of the decoding errors of the pixel blocks in each of the at least two frames which are prior to the present frame;

motion compensation means for generating from the decoded motion vectors at least two predicted pixel blocks corresponding to a present block which is block N+1 in a present video frame which is frame N+1; and predicted image selecting means, based on the decoding error maps, determining if the predicted pixel blacks include decoding errors corresponding to decoding errors in either of the at least two frames which are prior to the present frame, and thereby determining use of the predicted pixel blocks in reconstructing the present block.

10. The decoding apparatus of claim 9, wherein the video signal is a bit stream of variable length code, and the decoding device separates and decodes the variable length code from the bit stream and writes presence or absence of decoding errors in the decoding error maps.

11. The decoding apparatus of claim 9, wherein the motion compensation means generates one predicted pixel block based on a reconstructed video frame which is one frame before the present frame, and generates another predicted pixel block based on a reconstructed video frame which is two frames before the present frame.

12. A decoding apparatus according to claim 8, wherein said detector includes means for decoding the bit stream for information defining pixel blocks, the information including motion vectors;

means for detecting an error in the information of one of the pixel blocks being blocks N and N-M in each of at least two frames which are prior to a present frame said present frame being frame N+1, said at least two frames being frames N and N-M;

means for storing error information of the one of the pixel blocks in each of the at least two frames which are prior to the present frame;

means for storing video information of the at least two frames which are prior to a present frame;

means for generating from the decoded motion vectors at least two predicted pixel blocks corresponding to a present pixel block which is block N+1 in the present frame;

means for judging if one of the at least two predicted pixel blocks corresponds to error information of the at least two frames stored in the means for storing; and means for determining if the one of the at least two predicted pixel blocks is used In reconstructing the present block, based on judging of the means for judging.

13. The decoding apparatus of claim 12, wherein the means for storing stores bit errors of plural video frames by plotting pixel blocks in which bit error is detected in each video frame in a form of decoding error maps.

* * * * *

UNITED STATES PATENT AND TRADEMARK OFFICE
CERTIFICATE OF CORRECTION

PATENT NO. : 7,486,734 B2
APPLICATION NO. : 09/050808
DATED : February 3, 2009
INVENTOR(S) : Yutaka Machida It is certified that error appears in the above-identified patent and that said Letters Patent is hereby corrected as shown below:

At Column 10, line 21, "block N+1 based on steps a) and b)." should read
--block N+1.--

At Column 10, line 30, "N-H" should read --N-M--

At Column 10, line 44, "memory." should read --memory; and step c) includes the step of using one of the at least two predicted pixel blocks in reconstructing the present pixel block based on the judging.--

At Column 11, line 42, "memory for staring" should read --memory for storing--

At Column 12, line 2, "pixel blacks" should read --pixel blocks--

Signed and Sealed this

Eighteenth Day of August, 2009

David J. Kappos
*Director of the United States Patent and Trademark Office*